United States Patent [19]

Sakai et al.

[11] Patent Number: 5,279,924
[45] Date of Patent: Jan. 18, 1994

[54] MANUFACTURING METHOD OF OPTICAL DIFFRACTION GRATING ELEMENT WITH SERRATED GRATINGS HAVING UNIFORMLY ETCHED GROOVES

[75] Inventors: Keiji Sakai, Nara; Katsuhiro Kubo, Yamatokoriyama; Yukio Kurata, Tenri; Takahiro Miyake, Tenri; Yoshio Yoshida, Tenri, all of Japan

[73] Assignee: Sharp Kabushiki Kaisha, Osaka, Japan

[21] Appl. No.: 908,866

[22] Filed: Jul. 1, 1992

Related U.S. Application Data

[63] Continuation of Ser. No. 610,930, Nov. 9, 1990, abandoned, which is a continuation-in-part of Ser. No. 503,039, Apr. 2, 1990.

[30] Foreign Application Priority Data

| Apr. 4, 1989 | [JP] | Japan | 1-85510 |
| Nov. 13, 1989 | [JP] | Japan | 1-294403 |
| Nov. 15, 1989 | [JP] | Japan | 1-298100 |
| Mar. 7, 1990 | [JP] | Japan | 2-57472 |

[51] Int. Cl.[5] .............................. G03C 5/00
[52] U.S. Cl. .................... 430/290; 430/299; 430/321; 359/566
[58] Field of Search .......... 430/290, 299, 321; 350/162.17

[56] References Cited

U.S. PATENT DOCUMENTS

| 4,806,442 | 2/1989 | Shirasaki et al. | 430/321 |
| 4,806,454 | 2/1989 | Yoshida et al. | 430/321 |
| 4,842,969 | 6/1989 | Kawatsuki et al. | 430/321 |
| 4,895,790 | 1/1990 | Swanson et al. | |

FOREIGN PATENT DOCUMENTS

| 63-240502 | 10/1988 | Japan. |
| 64-09683 | 1/1989 | Japan. |
| 64-42885 | 2/1989 | Japan. |

OTHER PUBLICATIONS

Blazing of Holographic Grating by Ion Etching Technique Japan J. Appl. Phys. vol. 15 (1976), No. 4.
"Ion-etched High-efficiency Holographic Component" in published in Report of the Autumn Science Lecture Meeting of the Precision Engineering Society (Sep. 30, 1990) by Yukio Kurata et al.
"Holographic CD Pickup" in Report of the Autumn Science Lecture Meeting of the Precision Engineering Society (1989) by Katsuhiro Kubo, et al.
"Optical Properties of Blazed Ion-etched Holographic Grating" Applied Physics, vol. 48, No. 6 (1979), 539 by Kazuo Sano et al.
Ion-Etched Blazed Holographic Zone Plates by K. Kosuge et al., ICO-13 Conference Digest, Aug. 1984.
"A Blazed Grating Fabricated by Sychrotron Radiation Lithography" Japanese Journal of Applied Physics, vol. 25, No. 10, Oct. 1986.

Primary Examiner—Marion E. McCamish
Assistant Examiner—Mark A. Chapman

[57] ABSTRACT

The method of manufacturing an optical diffraction grating element of the present invention is characterized in adopting an ion beam made from a gas chemically reacting with a glass substrate when forming a diffraction grating having a serrated profile upon the glass substrate through an ion beam etching method. Also, when manufacturing an optical diffraction grating element that is divided into a plurality of regions whereon diffraction gratings having different diffraction angles with respect to an incident light are provided, the method of the present invention is characterized in forming slits into a resist film disposed upon a transparent substrate such as a glass substrate, in accordance with the patterns of the diffraction gratings, such that the width of the slits is constant irrespectively of the regions. Accordingly, the method of manufacturing an optical diffraction grating element of the present invention enables to improve the diffraction efficiency of the optical diffraction grating element, and to enhance the optical efficiency of an optical head device. The SN ratio of the output signals released by the optical head device may be thus improved and the servo error control executed accurately.

12 Claims, 9 Drawing Sheets

MANUFACTURING METHOD OF OPTICAL DIFFRACTION GRATING ELEMENT WITH SERRATED GRATINGS HAVING UNIFORMLY ETCHED GROOVES

This application is a continuation of application Ser. No. 07/610,930 filed on Nov. 9, 1990, now abandoned which is a continuation-in-part of application Ser. No. 07/503,039 filed on Apr. 2, 1990 pending.

FIELD OF THE INVENTION

The present invention relates to a method of manufacturing an optical diffraction grating element for use in an optical head device employed for writing, reading and erasing information on various types of optical recording mediums. The invention particularly relates to a method of preparing diffraction gratings on a plurality of regions formed on a transparent substrate for use in an optical diffraction grating element, such that the diffraction gratings have serrated profiles, and have mutually different angles of diffraction with respect to an incident light.

BACKGROUND OF THE INVENTION

The development of various types of optical recording mediums, such as for example Read-Only type, Write-Once type and Rewritable type optical recording mediums, has been intensively conducted in recent years. An optical head device used for writing, reading or erasing information on such optical recording mediums, usually comprises a laser light source, an optical system and a photodetector. The optical system leads a laser light emitted from the laser light source onto an optical recording medium and also leads the light reflected off of the optical recording medium onto the photodetector. Based on the reflected light led thereto by the optical system, the photodetector releases an electric signal by which information will be read. The optical system includes an element, e.g. a beam splitter, that creates a forward path, i.e. the path extending from the laser light source to the optical recording medium, and a return path, i.e. the path extending from the optical recording medium to the photodetector.

However, the implementation of the beam splitter causes the optical head device to be heavy and expensive, and recently the adoption of an optical diffraction grating element as an element for separating the forward and return paths has been suggested. In the case where an optical diffraction grating element is adopted, the optical efficiency of the optical head device may be improved by giving a serrated configuration to the profiles of the diffraction gratings constituting the optical diffraction grating element, as discussed in the report of "Efficiency Holographic Optical Head for CD Players" at Lecture Meeting of 48th Applied Physics Meeting.

The manufacturing method of an optical diffraction grating element composed of diffraction gratings having serrated profiles (hereinafter referred to as serrated gratings) will be discussed hereinbelow.

First, at least one grating pattern to be formed should be calculated with an electronic computer. Based on this grating pattern, an electron beam is scanned through the electron-beam lithography method to form a reticle which has a pattern ten times as large as the real grating pattern. Using the reticle, a photomask 3 corresponding to the desired grating pattern is produced by means of a photo-repeater while optically reducing the enlarged pattern to 1/10, as illustrated in FIG. 8(a). The photomask 3 comprises light transmitting parts A and shadowing parts B formed on a substrate 1. The light transmitting parts A correspond to the parts of the substrate 1 whereon a shadowing thin film 2 is not accommodated, while the shadowing parts B correspond to the parts of the substrate 1 whereon the shadowing thin film 2 is accommodated.

Meanwhile, as illustrated in FIG. 8(b), the surface of a transparent substrate 4 made of glass or other material for use in optical diffraction grating elements, is washed with detergent, water or organic solvent. The surface of the transparent substrate 4 is then coated with a resist film 5 by means of a coating machine, namely a spin-coater, as shown in FIG. 8(c), and the photomask 3 is set in close contact with the resist film 5, as illustrated in FIG. 8(d). Ultraviolet light is irradiated causing the resist film 5 to be exposed and the grating pattern of the photomask 3 to be transferred as a latent image on the resist film 5.

Then, as illustrated in FIG. 8(e), the resist film 5 is developed to form a plurality of slits 6 in accordance with the above grating pattern. Here the ratio of the width wa' of one slit 6, to the width wb' of the resist film 5 remaining between two adjacent slits 6 is set so as to be equal to 1:1. Thereafter, an ion beam such as Ar gas is projected at a fixed incident angle with respect to the surface of the resist film 5, and the resist film 5 and the transparent substrate 4 are etched to produce a serrated grating 7, as shown in FIG. 8(f).

However, although the transparent substrate 4 made of glass used in the above optical diffraction grating element is suitable in terms of optical characteristics and resistance to the environment, in case of physical etching through an Ar gas ion beam, the etching velocity of glass is relatively small. Consequently, it becomes difficult to obtain a sufficient difference between the etching velocity of glass and the etching velocity of the resist film 5, causing the profile of the serrated grating 7 to show an obtuse blazed opening angle $\tau'$ (i.e., the angle formed by two inclined surfaces constituting each V-shaped groove of the serrated grating 7). This, in turn, causes the difference between the light intensities of a +1 order diffracted light and a −1 order diffracted light produced in the optical diffraction grating element comprising the serrated grating 7, to decrease. However, to enhance the optical efficiency of the optical head device, the difference between the light intensities of the +1 order diffracted light and the −1 order diffracted light needs to be as great as possible, and provision is made such that the one among the +1 and −1 order diffracted lights having the greatest light intensity is directed onto the photoconductor. Consequently, if the blazed opening angle $\tau'$ is an obtuse angle, the optical head device suffers from the drawback that its optical efficiency lowers.

One might think of employing a resist film 5 whose etching velocity is even smaller than the etching velocity of the glass forming the transparent substrate 4. However, in this case the resist film 5 that was etched, sometimes adheres again to the transparent substrate 4, and the elimination of the resist film 5 remaining after etching is completed, is difficult.

A known method adopted for producing a servo error signal in the optical head device, consists in dividing the transparent substrate 4 into two regions 4a and 4b, forming a serrated grating 7a whose diffraction angle with respect to an incident light is relatively large in the region 4a, and forming a serrated grating 7b whose difraction angle with respect to the incident light is relatively small in the region 4b, as illustrated in FIG. 10(b). In this case, provision is made such that the grating pitch $d_2'$ of the serrated grating 7b is greater than the grating pitch $d_1'$ of the serrated grating 7a. When the slits 6 are formed in the resist film 5, provision should therefore be made such that the width $wa_2'$ of slits 6b formed in the region 4b is greater than the width $wa_1'$ of slits 6a formed in the region 4a, as illustrated in FIG. 10(a).

However, in this case, the depth $t_2'$ of the serrated grating 7b that was etched through the slits 6b of the relatively wide width $wa_2'$, is greater than the depth $t_1'$ of the serrated grating 7a that was etched through the slits 6a of the relatively narrow width $wa_1'$. Hence, a difference occurs between the diffraction efficiency of the region 4a and the diffraction efficiency of the region 4b causing an undesirable difference between the light intensities of the diffracted lights led onto the photodetector through the region 4a and the region 4b respectively and rendering it infeasible to produce the servo error signal for example, accurately.

SUMMARY OF THE INVENTION

An object of the present invention is to provide a method of manufacturing an optical diffraction grating element capable of enhancing the optical efficiency of an optical head device.

Another object of the present invention is to provide a method of manufacturing an optical diffraction grating element that comprises a plurality of regions having mutually different angles of diffraction with respect to an incident light, and that has a uniform diffraction efficiency throughout.

In order to achieve the above objects, a method of manufacturing an optical diffraction grating element in accordance with the present invention comprises a process of a forming diffraction grating having a serrated profile on a glass substrate through an ion beam etching method, and is characterized in that the gas adopted for emitting the ion beam is a gas chemically reacting with the glass substrate.

The gas adopted by the above manufacturing method for emitting the ion beam, is a gas chemically reacting with the glass substrate. Consequently, the glass substrate is not only physically etched through the projection of the ion beam but also chemically etched due to the chemical reaction of the above gas and the glass substrate. This arrangement permits increase of the etching velocity of the glass substrate thereby producing a relatively great difference between the etching velocity of the glass substrate and the etching velocity of the resist film. As a result, a diffraction grating having an acute-angled serrated profile may be formed, thereby improving the diffraction efficiency of the optical diffraction grating element and enhancing the optical efficiency of the optical head device. In addition, the resist film employed does not particularly need to have a small etching velocity whereby drawbacks such as the re-adhesion of the resist film, or a difficult removal of the resist film after etching is completed, do not arise.

Another feature of the present invention resides in the provision of a method of manufacturing an optical diffraction grating element that includes a process of forming through an ion beam etching method diffraction grating having serrated profiles and having mutually different diffraction angles with respect to an incident light. The method is characterized in forming slits with no resist film in a resist film fixed on a transparent substrate in accordance with the patterns of the diffraction gratings such that the width of the slits is substantially constant irrespectively of the diffraction grating pattern.

With the above arrangement, the width of the slits is substantially constant anywhere irrespectively of the region among the regions having mutually different diffraction angles with respect to an incident light, on which the slits are formed. As a result, the configuration of the grooves (the width, depth, angle formed by the two surfaces composing the groove, the tilt angle of each surface, etc.) of the diffraction gratings formed through the ion beam etching method is substantially uniform. Accordingly, the diffraction efficiency of the optical diffraction grating element does not vary with the regions and is substantially uniform. When, for example, employed in the optical head device of an optical recording/reproducing apparatus, an optical diffraction grating element produced with the manufacturing method of the present invention thus enables the servo error signal to be obtained accurately.

The invention being thus described, it will be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

BRIEF DESCRIPTION OF THE DRAWINGS

FIGS. 1(a) to (f) are schematic vertical cross-sectional views illustrating a manufacturing process of an optical diffraction grating element.

FIG. 2 is a fragmentary enlarged view of FIG. 1(f).

FIG. 6 and FIG. 7 are views illustrating another embodiment of the present invention.

FIGS. 7(a) and (b) are vertical cross-sectional views showing serrated gratings etched by an ion beam made from Ar gas.

FIGS. 8 to 10 are views illustrating a conventional example.

FIG. 9 is a schematic vertical cross-sectional view illustrating a diffraction grating.

FIG. 10(a) is a schematic vertical cross-sectional view illustrating slits formed in a resist film disposed upon the surface of a substrate for use in an optical diffraction grating element.

FIG. 10(b) is a schematic vertical cross-sectional view illustrating an optical diffraction grating element provided with regions having mutually different diffraction angles.

DESCRIPTION OF THE PREFERRED EMBODIMENTS

An embodiment of the present invention will be discussed hereinbelow with reference to FIGS. 1 to 5.

The optical diffraction grating element produced with the manufacturing method of the present invention, may be implemented in the optical system of an optical head device adapted to a compact disk player; video disk player; optical recording/reproducing apparatus of both write-once type and rewritable type or other apparatus.

As schematically illustrated in FIG. 1(f), an optical diffraction grating element 11 of the present embodiment comprises a diffraction grating having a serrated profile (hereinafter referred to as serrated grating) 13 formed upon a glass substrate 12. In an optical head device, not shown, equipped with the optical diffraction grating element 11, a laser light emitted from a laser light source passes through the optical diffraction grating element 11 and reaches an optical recording medium. The light that was reflected off of the recording medium, returns to the optical diffraction grating element 11 where it is diffracted, and is conducted to a photodetector via a path different from the forward path, i.e., the path leading the laser light from the laser light source onto the optical diffraction grating element 11. The photodetector releases an electric signal derived from the diffracted light that was led thereto through the optical diffraction grating element 11. This electric signal will be used for reading information.

The manufacturing method of the optical diffraction grating element 11 will be described hereinbelow.

Figure 1A:
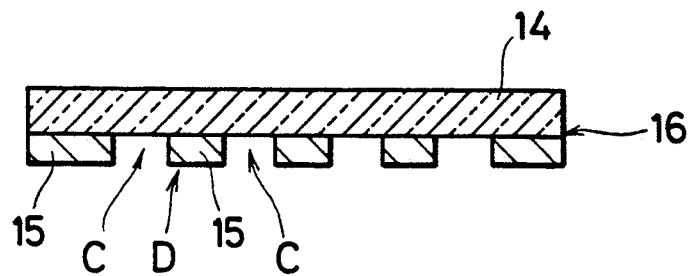

First, at least one grating pattern should be calculated with an electronic computer in accordance with the relative positions of the optical diffraction grating element and the photodetector disposed in the optical head device. Based on this grating pattern, an electron beam is then scanned through the electron-beam lithography method, forming a reticle which has a pattern ten times as large as the real grating pattern. Using the reticle, the enlarged pattern is optically reduced to 1/10 and a photomask 16 is produced by means of a photo-repeater, as illustrated in FIG. 1(a). The photomask 16 produced comprises light transmitting parts C and shadowing parts D. The light transmitting parts C correspond to the parts of a substrate 14 whereon a shadowing thin film 15 is not accommodated, while the shadowing parts D correspond to the parts of the substrate 14 whereon the shadowing thin film 15 is accommodated.

Figure 1B:
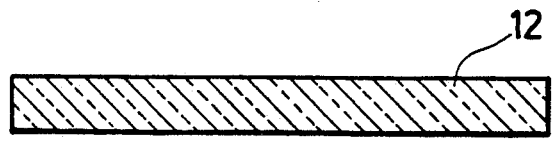
Figure 1C:
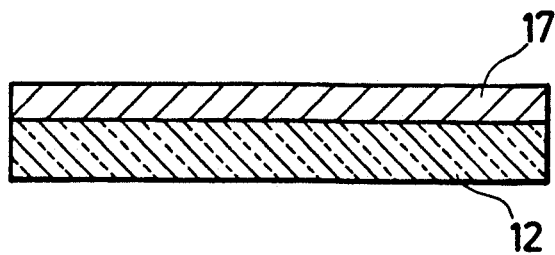
Figure 1:
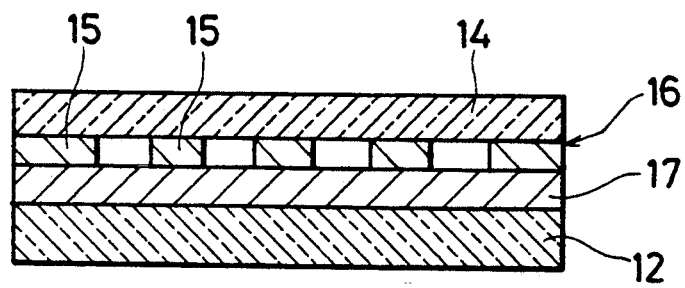
FIGS. 1 to 5 illustrate an embodiment of the present invention.
Figure 1:
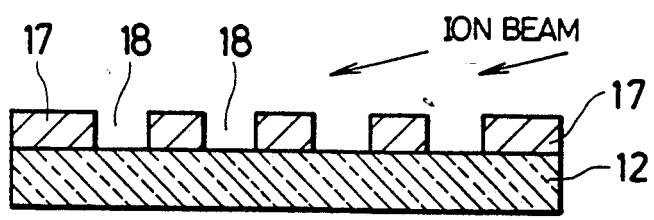
Figure 1:
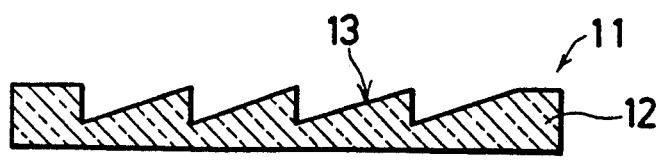

Meanwhile, as illustrated in FIG. 1(b), the surface of the glass substrate 12 (made of, for example, green sheet glass, silica glass or other material) implemented in the optical diffraction grating element 11, is washed with detergent, water or organic solvent. The surface of the glass substrate 12 is them coated with a resist film 17 by means of a coating machine, namely a spincoater, as shown in FIG. 1(c).

Further, the photomask 16 is bonded upon the resist film 17, as illustrated in FIG. 1(d). Ultraviolet light is irradiated from the substrate 14 side causing the resist film 17 to be exposed and the grating pattern of the photomask 16 to be transferred as a latent image on the resist film 17. Then, as illustrated in FIG. 1(e), the resist film 17 is developed to form a plurality of slits 18 corresponding to the above grating pattern.

Figure 2:
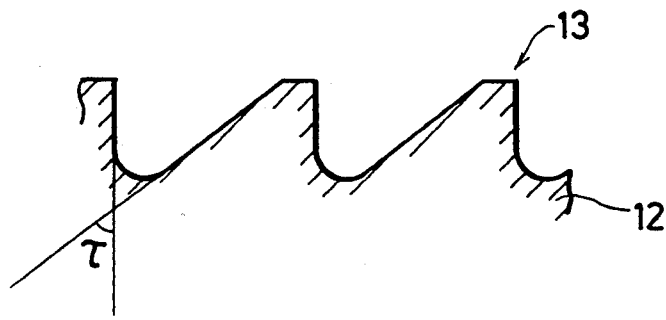

Thereafter, an ion beam is obliquely projected upon the surface of the resist film 17 at a fixed incident angle. The above ion beam is made from a gas that chemically reacts with the glass substrate 12, e.g., $CF_4$, $CHF_3$, $C_2F_6$, $NF_3$ gas or other gas. The glass substrate 12 is etched to form the serrated grating 13, shown in FIG. 1(f). Here, the chemical reaction of the $CF_4$, $CHF_3$, $C_2F_6$, $NF_3$ gas or other gas, with the glass substrate 12, causes the glass substrate 12 to be etched physically and chemically thereby speeding the etching process up. The serrated grating 13 may be thus formed such as to have an acute blazed opening angle $\tau$, as illustrated in FIG. 2 showing an enlarged section of FIG. 1(f). Here, the blazed opening angle $\tau$ is the angle formed by an inclined surface and the surface facing it that constitute each groove.

The following description will discuss the different configurations obtained as the resist film 17 and the glass substrate 12 are etched to form the serrated grating 13 through projection of ion beams respectively made of $CF_4$, $CHF_3$, and $C_2F_6$.

Figure 3A:
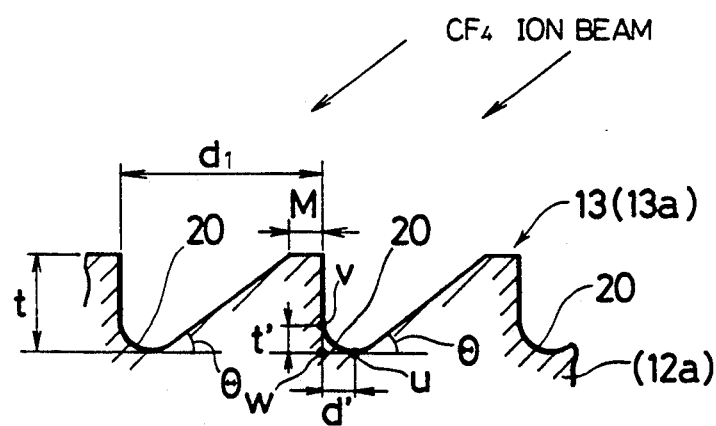
FIGS. 3(a) and (b) are vertical cross-sectional views showing serrated gratings etched by an ion beam made from $CF_4$ gas.

When the serrated grating is etched by an ion beam made from $CF_4$ gas, grooves and flat lands positioned between adjacent grooves are successively formed as shown in FIG. 3(a). This configuration possesses a high diffraction efficiency. Each groove is made up of an inclined surface forming a groove tilt angle $\Theta$ with a plane parallel with the land surface and a curved surface 20 having a portion which faces the inclined surface, being substantially perpendicular to the land surface and that is connected with the inclined surface by a gradual curve. The tangent point u of the curved surface 20 and a horizontal line is positioned at the lowermost part of the curved surface 20. The portion of the curved surface 20 upwards a tangent point v of the curved surface 20 and a vertical line rises so as to make a substantially right angle with the land surface. When the intersection of the horizontal line and the vertical line is represented by w; the distance between the tangent point u and intersection w is represented by d'; and the distance between the tangent point v and the intersection w is represented by t', the distance t' and d' are constants which define the configuration of the curved surface 20. When the serrated grating 13 is etched by an ion beam made from $CF_4$ gas, d' is approximately equal to 10-20% of the grating pitch $d_1$, while t' is approximately equal to 20-40% of the groove depth t.

Figure 4A:
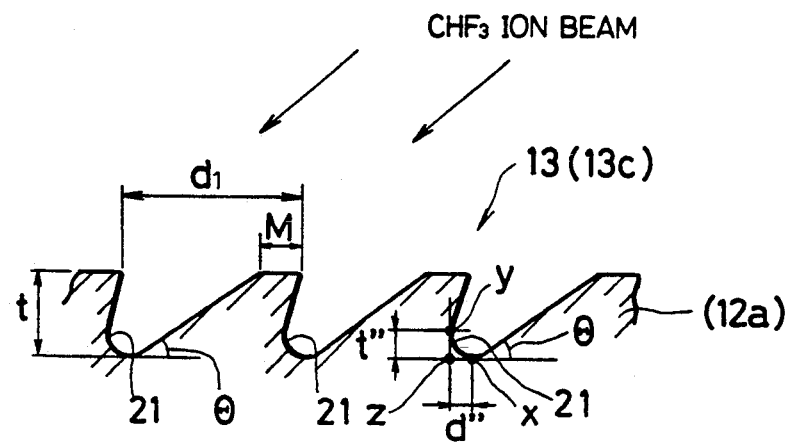
FIGS. 4(a) and (b) are vertical cross-sectional views showing serrated gratings etched by an ion beam made from $CHF_3$ gas.
Figure 4B:
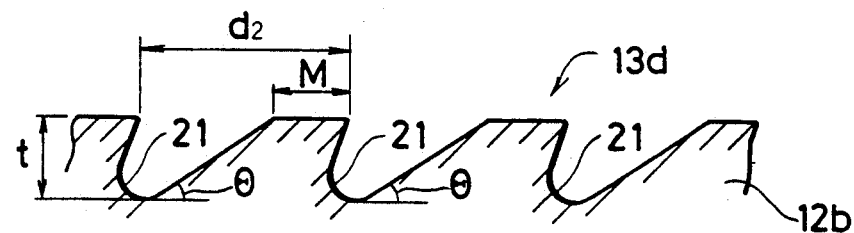

Similarly, when the serrated grating 13 is etched by an ion beam made from $CHF_3$ gas, grooves and lands positioned between adjacent grooves are successively formed as shown in FIG. 4(a). This configuration possesses a high diffraction efficiency. Each groove is made up of an inclined surface having a groove tilt angle $\Theta$, as in the above example, and a curved surface 21 having a higher curvature than when the $CF_4$ ion beam was projected. When, the tangent point of the curved surface 21 and a horizontal line is represented by x; the tangent point of the curved surface 21 and a vertical line is represented by y; and the intersection of the above horizontal line and vertical line is represented by z, the distance t" between the tangent point y and the intersection z and the distance d" between the tangent point x and intersection z are constants which define the configuration of the curved surface 21. When the serrated grating 13 is etched by an ion beam made from $CHF_3$ gas, d" is approximately equal to 10–20% of the grating pitch $d_1$, while t" is approximately equal to 40–60% of the groove depth t.

Figure 5A:
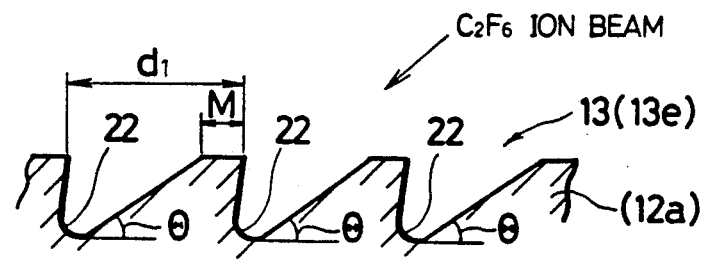
FIGS. 5(a) and (b) are vertical cross-sectional views showing serrated gratings etched by an ion beam made from $C_2F_6$ gas.
Figure 5B:
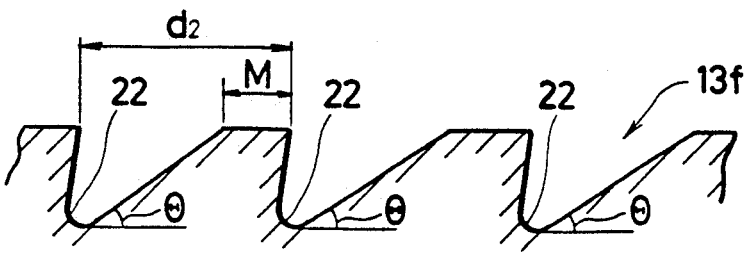

Furthermore, when the serrated grating 13 is etched by an ion beam made from $C_2F_6$ gas also, grooves and lands positioned between adjacent grooves are successively formed as shown in FIG. 5(a). This configuration possesses a high diffraction efficiency. Each groove is made up of an inclined surface having the same groove tilt angle $\Theta$ as mentioned above and a curved surface 22 having an intermediate curvature as compared to the curved surface 20 and the curved surface 21.

After etching is completed, unneeded remaining portions of the resist film 17 should be removed with a solvent such as acetone or the like, or removed with ashing by means of $O_2$ gas.

In the present embodiment, the serrated grating 13 may be formed such as to have an acute blazed opening angle $\tau$ by employing a gas that chemically reacts with the glass substrate 12, for etching the same. Accordingly, the light intensity of a +1 order diffracted light may be increased and the light intensity of a −1 diffracted light may be decreased. Here, the +1 order diffracted light is the diffracted light among the diffracted lights produced as the reflected light from the optical recording medium is diffracted by the optical diffraction grating element 11, that is directed onto the photodetector. As to the −1 order diffracted light, it is the diffracted light that is not directed onto the photodetector. This permits to improve the optical efficiency of the optical head device comprising the optical diffraction grating element 11, or in other words, to improve the product of (i) the ratio of the intensity of the transmitted light to the intensity of the laser light when the laser light emitted by the laser light source is transmitted through the optical diffraction grating element 11 on the forward path (i.e., 0th order diffraction efficiency), and (ii) the ratio of the intensity of the +1 order diffracted light to the intensity of the reflected light when the reflected light from the optical recording medium is diffracted by the optical diffraction grating element 11 on the return path (i.e., +1 order diffraction efficiency). As a result, the detection of information and other operations may be executed accurately by the photodetector and the S/N of output signals released in the optical head device may be improved. The above results are particularly remarkable when the glass substrate 12 is made of silica glass. In addition, the resist film employed does not need to have a particularly small etching velocity. There are thus no instances of re-adhesion of the resist film and the removal of the resist film after etching can be performed easily.

Another embodiment of the present invention will be described hereinbelow with reference to FIGS. 3 to 7. Here, the members having the same function than in the aforementioned embodiment will be designated by the same code and their description will be omitted.

Figure 6A:
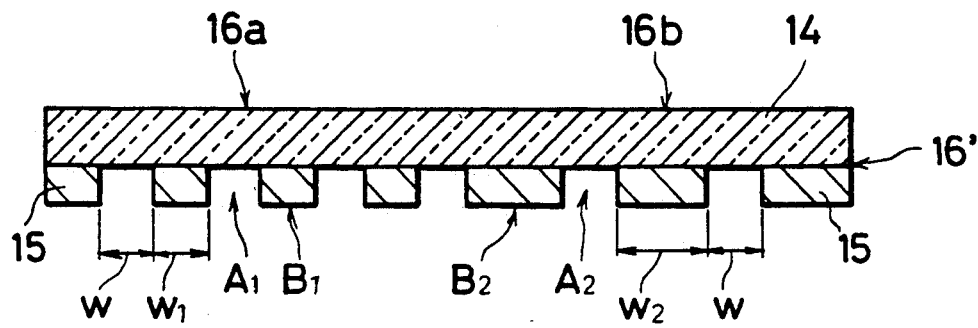
FIG. 6(a) is a schematic vertical cross-sectional view illustrating a photomask.
Figure 6B:
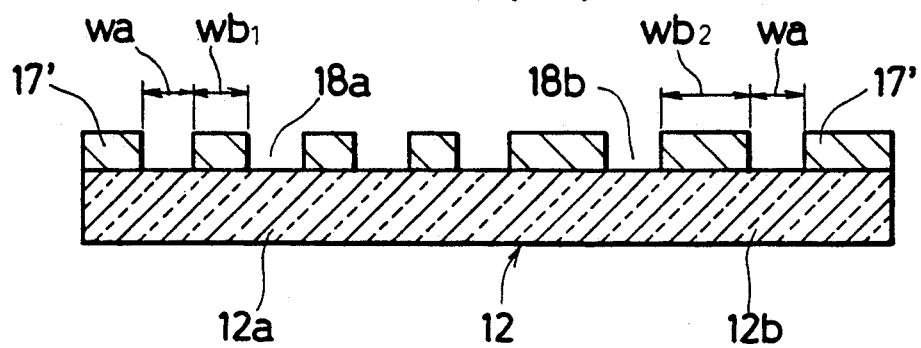
FIGS. 6(b) and 6(c) are a schematic vertical cross-sectional view illustrating slits formed in a resist film disposed upon the surface of a substrate for use in an optical diffraction grating element.
Figure 6C:
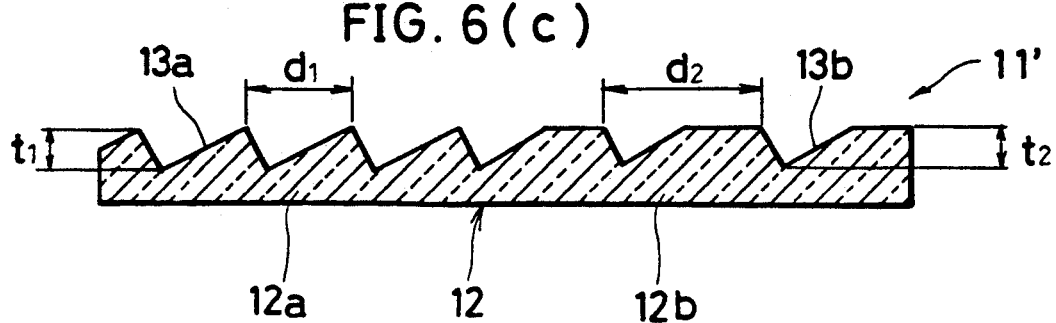
Figure 7:
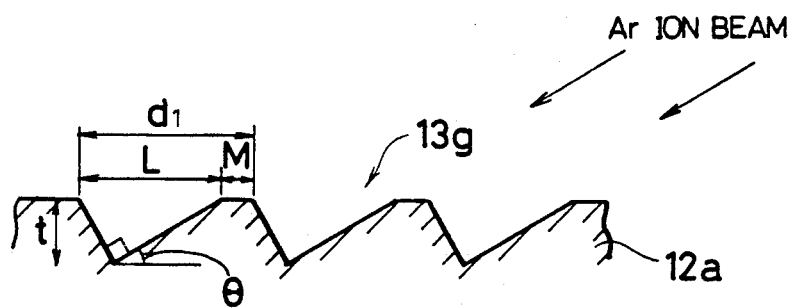
Figure 7:
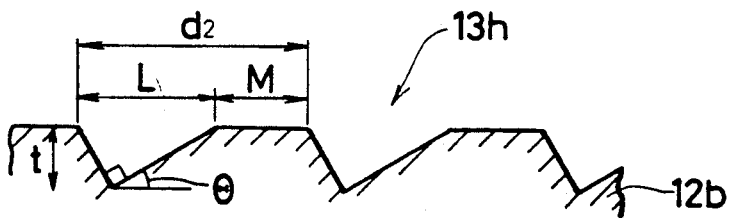
Figure 8A:
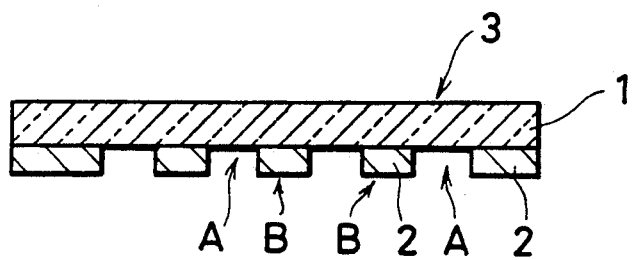
FIGS. 8(a) to (f) are schematic vertical cross-sectional views illustrating a manufacturing process of an optical diffraction grating element.
Figure 8B:
Figure 8C:
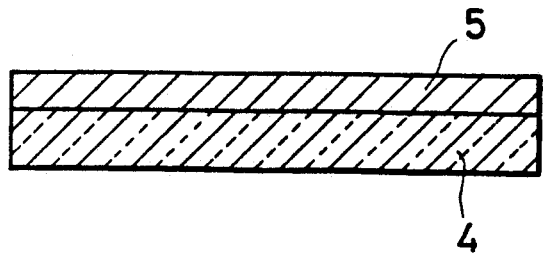
Figure 8D:
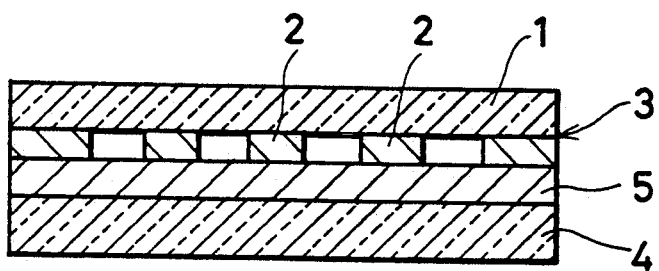
Figure 8E:
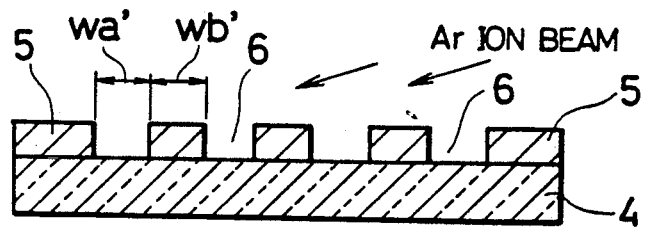
Figure 8F:
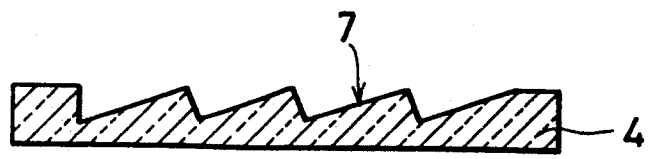
Figure 9:
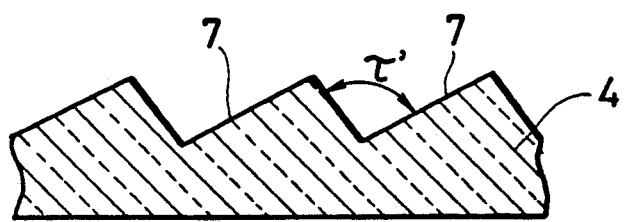
Figure 10:
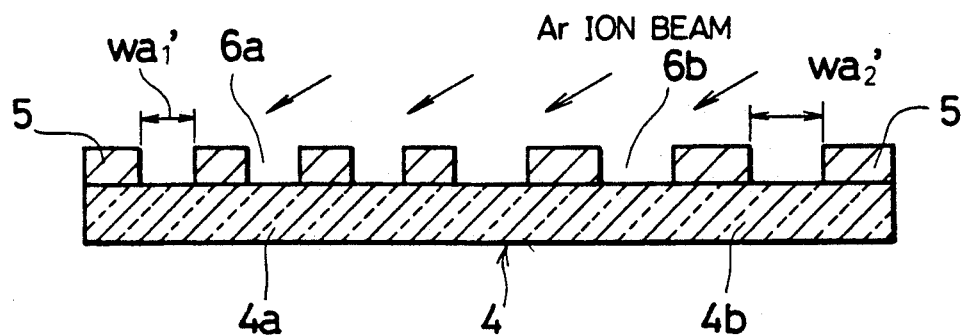
Figure 10:
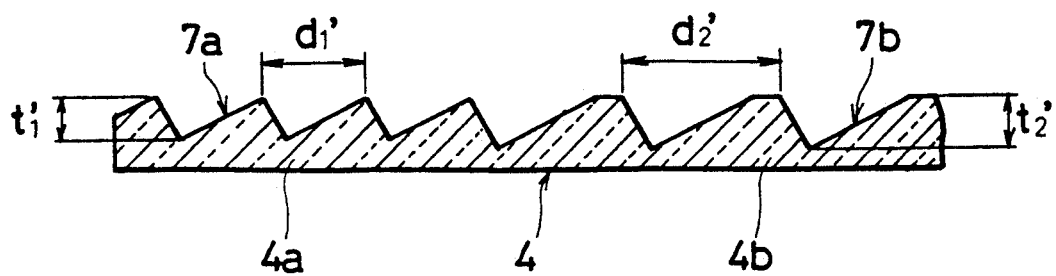

An optical diffraction grating element 11' of the present embodiment is produced by dividing a transparent substrate 12 made of glass or other material into a plurality of regions, and forming, for example as schematically shown in FIG. 6(c), a serrated grating 13a having a grating pitch $d_1$, and a serrated grating 13b having a grating pitch $d_2$. Here the values of the grating pitches $d_1$ and $d_2$ differ from each other such that, e.g. $d_1 < d_2$. The area of the optical diffraction grating element 11' whereon the serrated grating 13a is formed will be referred to as region 12a, while the area whereon the serrated grating 13b is formed will be referred to as region 12b. (The optical diffraction grating element 11' discussed in the present embodiment is divided into two regions, however it is not a restrictive example and the optical diffraction grating element 11' may be divided into 3 regions or more). As the grating pitches $d_1$ and $d_2$ differ from each other, the optical diffraction grating element 11' is designed such that the diffraction angle with respect to an incident light is different in the region 12a and in the region 12b.

In an optical head device, not shown, equipped with the optical diffraction grating element 11', a laser light emitted from a laser light source passes through the optical diffraction grating element 11' and reaches an optical recording medium. The light that was reflected off of the optical recording medium, returns to the optical diffraction grating element 11' where it is diffracted and is conducted to a photodetector via a path different from the forward path, i.e., the path leading the laser light from the laser light source onto the optical diffraction grating element 11'. At this time, the photodetector generates a servo error signal derived from two diffracted lights produced as the above reflected light is diffracted in different directions at the regions 12a and 12b of the optical diffraction grating element 11'.

The manufacturing method of the optical diffraction grating element 11' will be discussed hereinbelow.

First, a photomask 16' is produced in the same fashion as the photomask 16. However, the photomask 16' is provided with two regions 16a and 16b respectively corresponding to the regions 12a and 12b formed on the optical diffraction grating element 11', as illustrated in FIG. 6(a). For example, provision is made such that the width $W_2$ of shadowing parts $B_2$ formed in the region 16b, is greater than the width $W_1$ of shadowing parts $B_1$ formed in the region 16a. In addition, an essential feature of the present invention lies in the fact that the width of light transmitting parts $A_1$ formed in the region 16a, and the width of light transmitting parts $A_2$ formed in the region 16b are mutually equal and set to a value w. In other words, the photomask 16' is designed such that the width of the light transmitting parts does not vary with the regions 16a and 16b and is constant.

Meanwhile, as described earlier, the surface of the transparent substrate 12 is covered with a resist film 17' that is exposed through the photomask 16'. After exposure, the resist film 17' is developed to form a plurality of slits in accordance with the grating patterns. Here, as illustrated in FIG. 6(b), the width of slits 18a formed in the region 12a and the width of slits 18b formed in the region 12b are both equal to wa. In other words, the width of the slits does not vary with the regions 12a and 12b and is constant. On the other hand, when $wb_1$ represents the width of the resist film 17' remaining between adjacent slits 18a in the region 12a, and $wb_2$ represents the width of the resist film 17' remaining between adjacent slits 18b in the region 12a, $wb_2$ is greater than $wb_1$.

Then, etching is executed by projecting an ion beam obliquely upon the surface of the resist film 17'. The ion beam may be made from Ar gas, or when the transparent substrate 12 is made of glass (green sheet glass, silica glass or other glass), from $CF_4$, $CHF_3$, $C_2F_6$, $NF_3$ or other gas as discussed in the previous embodiment.

In the case, the resist film 17' and the substrate 12 are etched with an ion beam made from Ar gas, a serrated grating 13g having a grating pitch $d_1$ is formed in the region 12a as shown in FIG. 7(a), while a serrated grating 13h having a grating pitch $d_2$ is formed in the region 12b, as illustrated in FIG. 7(b). Both serrated gratings 13g and 13h include grooves having an unsymmetrical V-shaped section and flat lands each positioned between adjacent grooves, the grooves and lands being successively alternately formed. In addition, both serrated gratings 13g and 13h have a high diffraction efficiency. The grating pitches $d_1$ and $d_2$ are respectively equal to the sum of the groove width L and land width M. As mentioned earlier, the grating pitch $d_2$ is greater than the grating pitch $d_1$. This is due to the fact that the width $wb_2$ of the portions of the resist film 17' remaining in the region 12b is greater than the width $wb_1$ of the portions of the resist film 17' remaining in the region 12a.

Further, the essential feature of the present invention lies in the fact that, as the width of the slits 18a formed in the resist film 17' and the width of the slits 18b are both made equal to wa, the serrated gratings 13g and 13h may be formed such as to have substantially mutually equal groove widths L, grooves depth t and groove tilt angles $\Theta$. Here, the groove tilt angle $\Theta$ represents the angle formed by the long inclined surface of the groove with the plane which intersects the bottom of the groove and is parallel with the flat surface of the land. Also, the blazed opening angle $\tau$ is a substantially right angle everywhere. As it appears clearly from the above description, different grating pitches $d_1$ and $d_2$ are obtained by changing the land width M. In other words, the land width M of the region 12b is wider than that of the region 12a by the difference between the grating pitches $d_1$ and $d_2$.

Figure 3B:
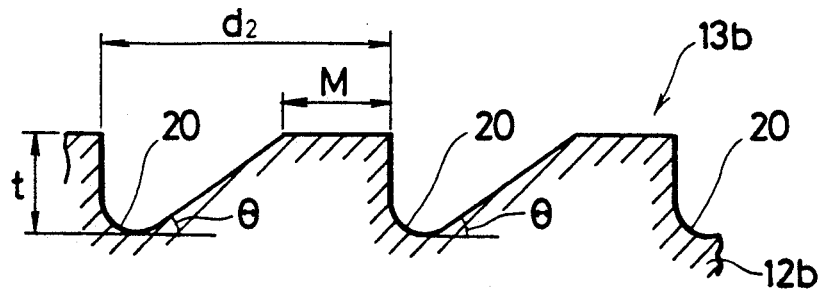

The following description will cover the configuration of the serrated gratings 13 formed respectively on the regions 12a and 12b when the resist film 17' and the transparent substrate 12 composed by a glass material are etched through the irradiation of an ion beam made from a gas chemically reacting with the transparent substrate 12. The serrated gratings 13a and 13b that were obtained when an ion beam made from $CF_4$ gas was adopted for etching, are illustrated in FIG. 3(a) and FIG. 3(b) respectively. When an ion beam made from $CHF_3$ gas was adopted for etching, the serrated gratings 13c and 13d obtained are shown in FIG. 4(a) and in FIG. 4(b) respectively. Further, FIG. 5(a) and FIG. 5(b) respectively illustrate serrated gratings 13e and 13f obtained when an ion beam made from $C_2F_6$ is adopted. In either cases and like when Ar gas was adopted, each groove that was formed by etching is composed by a long inclined surface having a groove tilt angle $\Theta$, and a curved surface 20 (21 or 22). The grooves have a substantially analogous configuration irrespectively of the regions 12a and 12b. In addition, as described above, the grating pitch $d_2$ of the region 12b is greater than the grating pitch $d_1$ of the region 12a by the difference between the land width M of the region 12b and that of the region 12a.

If, as described above, the grooves are designed such as to have the same configuration irrespectively of the regions 12a and 12b, it is in order to obtain mutually equal 0th order diffraction efficiencies and mutually equal first order diffraction efficiencies in both regions 12a and 12b. This enables the diffraction efficiency to be uniform throughout the optical diffraction grating element 11' composed of the serrated gratings 13a and 13b or the like. Hence, the implementation of the optical diffraction grating element 11' showing the above characteristics, in the optical system of an optical head device accommodated in an optical recording/reproducing apparatus, enables the laser light emitted by the laser light source to be focused with a high accuracy on a recording track of an optical recording medium. In addition, the implementation of the optical diffraction grating element 11' improves the S/N of the output signals released by the optical head device. Furthermore, in case use is made of the optical diffraction grating element 11' when generating the servo error signal, the lights that were diffracted in different directions in the region 12a and in the region 12b have substantially equal intensities thereby enabling the servo error control to be executed accurately.

The invention being thus described, it will be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A method of manufacturing an optical diffraction grating element comprising:
   (a) forming a resist film upon a transparent substrate, wherein said resist film and substrate are divided into plurality of regions;
   (b) exposing and developing each of said plurality of regions in said resist film for forming a plurality of diffraction grating patterns corresponding to each of said plurality of regions having slits free of resist film; and
   (c) etching said resist film and said transparent substrate by irradiation of an ion beam upon a surface of said transparent substrate at a fixed angle, to form upon said transparent substrate a plurality of diffraction gratings having serrated profiles and mutually different diffraction angles with respect to an incident light,
   wherein said slits formed during said exposing and developing process are designed such as to have a substantially constant width irrespectively of said plurality of diffraction grating patterns.

2. The method of manufacturing an optical diffraction grating element as defined in claim 1, further comprising
   (d) the step of preparing a photomask provided with light transmitting parts and shadowing parts formed upon said substrate in accordance with said plurality of diffraction grating patterns such that a shadowing film is not disposed upon said substrate in said light transmitting parts, and said shadowing film is disposed upon said substrate in said shadowing parts;
   wherein the widths of said light transmitting parts are substantially equal in width irrespectively of said diffraction grating patterns.

3. The method of claim 2, wherein the width of some of the shadowing parts on the photomasks are not of equal width and the exposing step uses said photomask;

the ion beam is directed to said substrate from one direction at an oblique angle; and a gas used which comprises the ion beam is a fluoride gas that reacts with the substrate to form curves in the serrated portions.

4. The method of claim 3, wherein the gas is $CF_4$.

5. The method of claim 3, wherein the gas is $CHF_3$.

6. The method of claim 3, wherein the gas is $C_2F_6$.

7. The method of claim 3, wherein the gas is $NF_3$.

8. The method of claim 1, wherein resist films remain between the slits after the development process the width of some of the resist films are greater than others a gas which comprises the ion beam is directed to said substrate from an oblique angle from only one direction and the gas is a fluoride gas effective to chemically react with said substrate to form curves in the serrated profiles.

9. The method of claim 1, wherein a gas which comprises the ion beam $CF_4$.

10. The method of claim 1, wherein a gas which comprises the ion beam is $CHF_3$.

11. The method of claim 1, wherein a gas which comprises the ion beam is $C_2F_6$.

12. The method of claim 1, wherein a gas which comprises the ion beam is $NF_3$.

* * * * *